United States Patent [19]

Nakazawa

[11] Patent Number: 4,861,141
[45] Date of Patent: Aug. 29, 1989

[54] ELECTRO OPTICAL DEVICE AND METHOD FOR MANUFACTURING SAME

[75] Inventor: Takashi Nakazawa, Suwa, Japan

[73] Assignee: Seiko Epson Corporation, Tokyo, Japan

[21] Appl. No.: 177,794

[22] Filed: Apr. 6, 1988

Related U.S. Application Data

[63] Continuation of Ser. No. 700,213, Feb. 11, 1985.

[30] Foreign Application Priority Data

Feb. 7, 1984 [JP] Japan .................................. 59-20485

[51] Int. Cl.$^4$ .............................................. G02F 1/133
[52] U.S. Cl. ..................................... 350/336; 350/334; 350/333
[58] Field of Search ................... 350/339 R, 334, 336, 350/332, 333; 357/6

[56] References Cited

U.S. PATENT DOCUMENTS

| | | | |
|---|---|---|---|
| 3,864,023 | 2/1975 | Glaser et al. | 350/336 |
| 3,864,905 | 2/1975 | Richardson | 350/345 |
| 4,046,666 | 9/1977 | McClanahan et al. | 313/593 X |
| 4,068,927 | 1/1978 | White | 350/336 X |
| 4,086,003 | 4/1978 | Kouchi et al. | 350/357 |
| 4,125,414 | 11/1978 | Tang et al. | 357/8 X |
| 4,297,004 | 10/1981 | Nishimura et al. | 350/336 |
| 4,413,883 | 11/1983 | Baraff et al. | 350/334 |
| 4,523,811 | 6/1985 | Ota | 350/339 R |
| 4,553,820 | 11/1985 | Harada | 350/339 D |

FOREIGN PATENT DOCUMENTS 0122477  7/1982  Japan .................................. 350/334

Primary Examiner—Stanley D. Miller
Assistant Examiner—Napoleon Thantu
Attorney, Agent, or Firm—Blum Kaplan

[57] ABSTRACT

An electro-optical device including non-linear metal-insulator-metal elements wherein the second metal film of the MIM is completely covered by the transparent picture cell electrode, having the same shape and configuration as the second metal film, is provided. Preferably, the second metal film layer has a thickness of about 100 Å or less.

25 Claims, 4 Drawing Sheets

ELECTRO OPTICAL DEVICE AND METHOD FOR MANUFACTURING SAME

This is a continuation of application Ser. No. 06/700,213 filed Feb. 11, 1985.

BACKGROUND OF THE INVENTION

This invention relates to an electro-optical device including non-linear metal-insulator-metal (MIM) devices arranged in a matrix and more particularly, to a MIM device wherein the second metal film layer is completely covered by a transparent picture cell electrode.

Liquid crystal display devices have application in many fields, especially in watches, electronic calculators and other portable electronic devices. Such devices employ various type display units to be driven at low voltages, thus requiring low power consumption. However, when such devices are employed in information display terminals or small hand-held electronic equipment, there are disadvantages. Such devices yield an image with relatively poor contrast regardless of the level of driving voltage. In addition, resolution and capacity of display information is limited due to the inability to drive the display in a multiplex mode.

In order to eliminate such disadvantages and increase the amount of information that can be shown, non-linear elements, such as MIM's, may be used in liquid crystal display devices. Prior art MIM elements are constructed by anodizing the surface of a Ta film pattern and forming a Cr pattern thereon. By such construction, a MIM element is formed by layering in the vertical direction at the junction of the overlapping Ta pattern and Cr pattern. In the conventional process for manufacturing such a MIM element, it was necessary to form a first metal film, a second metal film and a transparent picture cell electrode by different photolithographic steps. This was needed in order to construct the various components. The result was a low yield and increase in production costs.

Accordingly, it is desirable to provide a new MIM device and electro-optical devices including the MIM which overcomes the problems of the prior art outlined above.

SUMMARY OF THE INVENTION

Generally speaking, in accordance with the invention, an improved electro-optical device including a metal-insulator-metal element, which is formed with the second metal film layer having the same shape in plan view and in complete contact with an asssociated transparent picture cell electrode is provided. The metal-insulator-metal element includes a first metal film formed on an insulating substrate, an insulating film formed on the surface of the first metal film except at the terminal regions, a second metal film formed on top of the insulating film and the substrate and the transparent liquid crystal driving electrode in complete contact with the second metal film layer. The second metal film layer and the transparent picture cell electrode are formed by the same photolithographic process. The thickness of the second metal film layer is preferably less than 100 Å.

Accordingly, it is an object of the invention to provide an improved electro-optical device.

Another object of the invention is to provide an improved electro-optical device including a matrix of MIM devices formed by a simplified manufacturing process without deterioration of display quality.

A further object of the invention is to provide an improved electro-optical device wherein the second metal film of a MIM element is in complete contact with a transparent picture cell electrode.

Still another object of the invention is to provide an improved electro-optical device having greater reliability.

Still a further object of the invention is to provide a process for forming an improved electro-optical device including MIM elements wherein the second metal film of the MIM has the same shape as the liquid crystal driving electrode.

Still other objects and advantages of the invention will, in part, be obvious and will, in part, be apparent from the specification.

The invention accordingly comprises the several steps and the relation of one or more of such steps with respect to each of the others, and the apparatus embodying features of construction, combination of elements and arrangement of parts which are adapted to effect such characteristics, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF PREFERRED EMBODIMENTS

Figure 1:
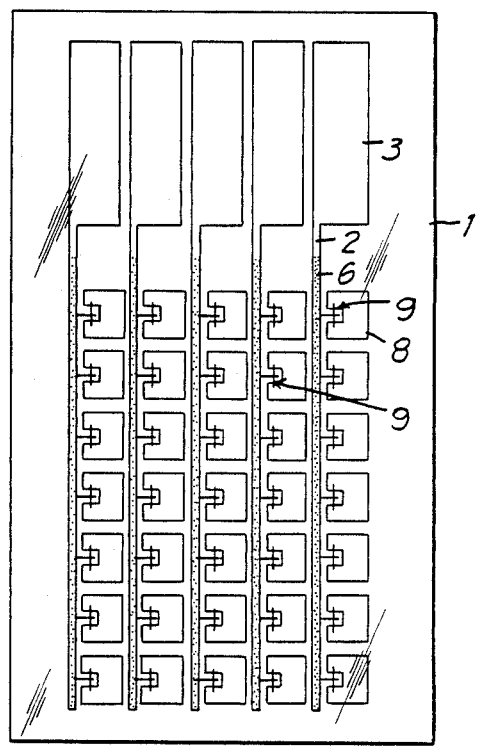
FIG. 1 is a schematic view of a conventional matrix of MIM elements arranged on a substrate.
Figure 2:
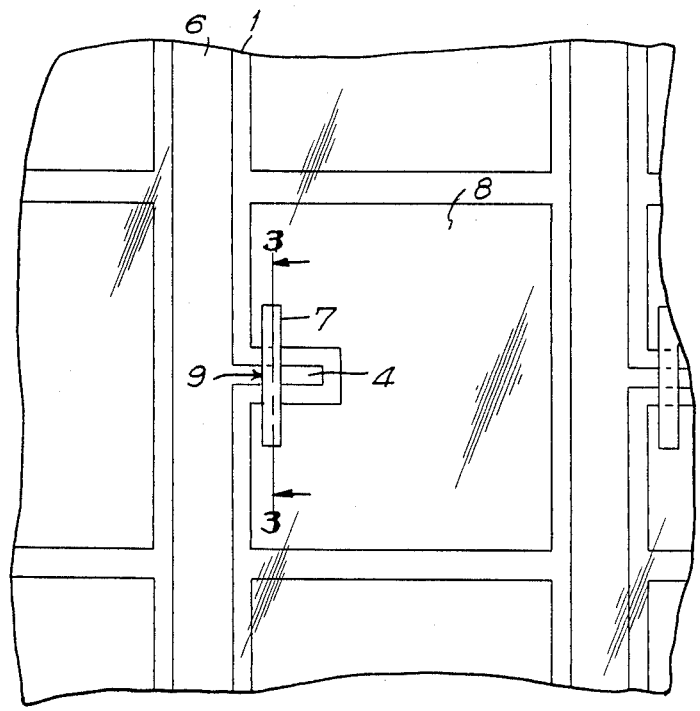
FIG. 2 is an enlarged view of a portion of the matrix of FIG. 1.

Referring to FIGS. 1 and 2, a plurality of MIM elements arranged in a matrix on an insulating substrate 1 and the structure of a MIM element in accordance with the prior art are shown. A conventional MIM element 9 includes a first metal film 2 on insulating substrate 1. First metal film 2 is used as a lead and as a terminal portion 3 for making contact with an external driving circuit and is formed with a plurality of projecting portions 4. An insulating film 6 is formed on the surface of metal film 2 except along terminal portion 3. A second metal film 7 is formed on insulating film 6 intersecting projecting portion 4 of first metal film 2. The intersection of first metal film projecting portion 4 and second metal film 7 with insulating film 6 therebetween creates a MIM element. A transparent picture cell electrode 8 is deposited on substrate 1 and connected electrically as a series with second metal film 7 of MIM element 9.

Figure 3:
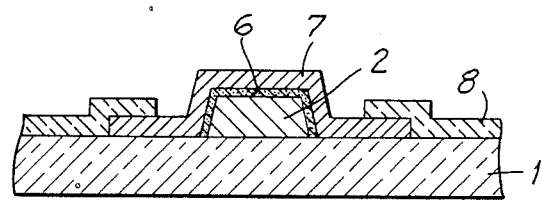
FIG. 3 is a cross-sectional view taken along line 3—3 of the MIM element of FIG. 2.

Turning to FIG. 3, MIM element 9 of FIGS. 1 and 2 is shown in cross-section. MIM element 9 is formed by the conventional process wherein first metal film 2 is deposited on an insulating substrate 1 and insulating film 6 is formed thereon. A second metal film 7 is formed on top of insulating film 3 across projecting portion 4. Transparent picture cell electrode 8 is formed on a portion of second metal film 7. Because of the different shape of each component of MIM element 9, three separate photolitographic steps are required in order to form the device. Each layer of the element has a different shape and the repetitional photolithographic steps result in lower yield and increased cost.

Figure 4:
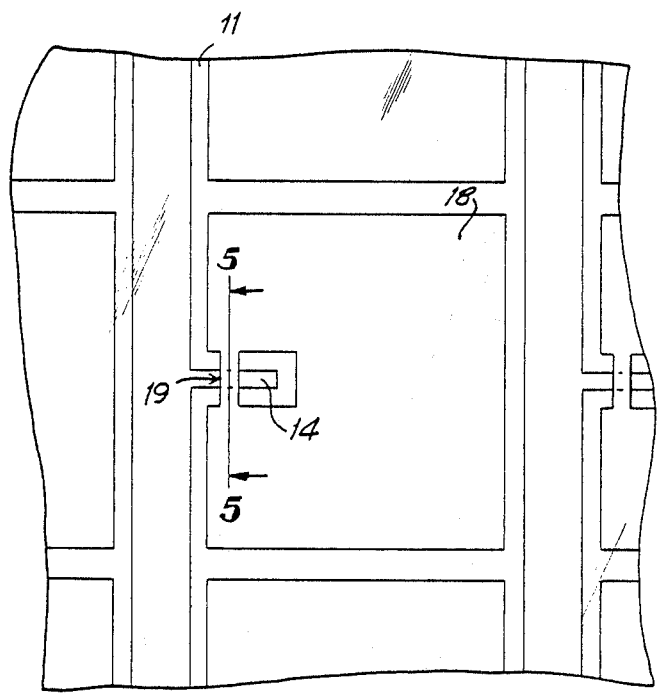
FIG. 4 is an enlarged view of a MIM element constructed according to the invention.
Figure 5:
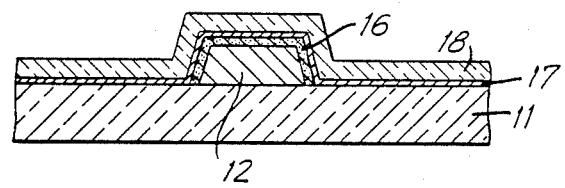
FIG. 5 is a cross-sectional view taken along line 5—5 of the MIM element of FIG. 4.
Figure 6A:
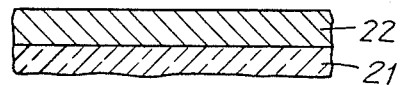
FIGS. 6(a)–6(d) are cross-sectional views showing a MIM element constructed in accordance with the invention during the process of manufacture.
Figure 6B:
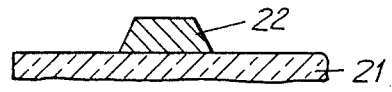
Figure 6C:
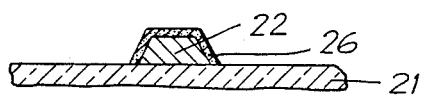
Figure 6D:
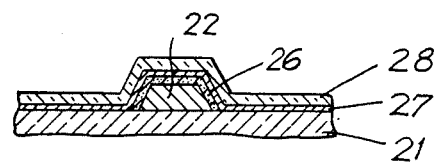

Referring now to FIGS. 4 and 5, a MIM element 19 in accordance with the invention is shown. A first metal film 12 having a terminal portion (not shown) and a projecting portion 14 is formed on an insulating substrate 11 and is covered with an insulating film 16. First metal film 12 is used as a lead on the same line and as the terminal for making contact with an outer driving circuit like terminal portion 3 of MIM element 9 of FIGS. 1-3. Insulating film 16 is formed on the top planar surface of first metal film 12 except at the terminal portion. A second metal film 17 is formed both on top of insulating film 16 of intersecting projecting portion 14 and on substrate 11. Preferably, second metal film 17 has a thickness less than or equal to 100Å. A transparent picture cell electrode 18 is formed on second metal film 17 such that second metal film layer 17 is completely covered by electrode 18. Thus, both electrode 18 and second metal film 17 have the same shape.

As second metal film 17 and transparent picture cell electrode 18 in accordance with the invention have the same planar shape, they may be patterned at the same time in one photolitographic step. Consequently, yield is improved and the MIM device can be sold at a lower cost. Additionally, second metal film 17 and transparent picture cell electrode 18 may be formed sequentially resulting in a more effective device. The area of contact between second metal film 17 and transparent picture cell electrode 18 in MIM element 19 is much larger than the contacting surfaces in conventional devices. Accordingly, there is no contacting fault therebetween and reliability in accordance with the invention is improved.

Cr, NiCr or Ta is used as second metal film 17 of MIM element 19. In using Cr, one can obtain stable elements having a high degree of non-linear characteristics. Additionally, when the thickness of the second metal film is maintained less than 100 Å, transmission loss of incident light through the transparent picture cell electrode is maintained to less than 10%. This reduction in transmission is not troublesome.

Referring now to FIGS. 6(a)-6(d), the process of the steps in manufacturing an electro-optical display device having an MIM element manufactured in accordance with the invention are shown in cross-section.

1. Ta film 22 is formed approximately 3,000 Å thick on transparent substrate 21 of an insulator material, such as Pyrex glass.

2. Ta film 22 is selectively etched to a fixed shape by a photo-etching method which results in the shape shown in FIG. 6(b). Preferably, plasma etching is used to provide high construction accuracy.

3. Ta film 22 is anodized in a citric acid-water solution to form a tantalum oxide film 26 thereon.

4. Two film layers are then formed in the same vacuum. Cr and ITO oxide targets are provided in a sputtering apparatus. Chromium film 27 is formed by sputtering to a desired thickness of 100 Å or less. Then, indium tin oxide film 28 is formed thereon by reactive sputtering. The transmission rate of incident light which passes through Cr-ITO films 27 and 28 is about 75% which is slightly less than that of a Cr film and is suitable for use.

5. Cr film 27 and an ITO film 28 are etched successively by a photo-etching utilizing the same pattern. Thus, the second metal film layer 27 and transparent picture cell electrode 28 are uniform in shape and are in complete contact with one another.

Figure 7:
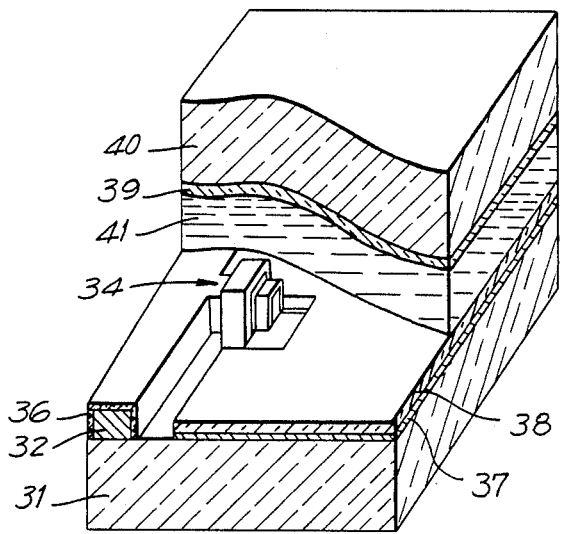
FIG. 7 is a perspective view partially cut away of a liquid crystal cell in accordance with the invention.

FIG. 7 shows a TN type liquid crystal cell for one picture element. A first metal film 32 of Ta with a plurality of projecting portions 34 is formed on an insulating substrate 31. An insulating film 36 of TaO is formed on first metal film 32. A second metal film 37 of chromium is formed on substrate 31 and overlaps corresponding projecting portion 34. A transparent picture element electrode 38 is deposited on second metal film 37. A second substrate 40 with an ITO transparent electrode 39 thereon is placed opposite substrate 31 and a liquid crystal material 41 is placed in the space between substrates 31 and 40.

When operating the electro-optical device shown in FIG. 7 by a time-multiplexing driving method, sufficient contrast can be obtained at a duty ratio of 1/500 and greater. Consequently, the quality of the display is improved.

In an MIM element consisting of a first metal film of Ta, a $Ta_2O_5$ insulating film and a second metal film of Cr, the second metal film can be formed having a thickness of 50 Å. When operating an electro-optical including such a MIM device by the time-multiplexing driving method at a duty ratio of 1/500, the transmission rate of incident light through the transparent picture cell electrode film is greater for the cell than in the embodiment of FIG. 7. Consequently, contrast is improved and display quality is improved compared to the device of FIG. 7.

A further embodiment of an MIM element in accordance with the invention includes a first metal film of Ta, a second film of Ta and an intermediate insulator of $Ta_2O_5$. The MIM element is manufactured in a similar manner as described earlier. The second metal film is formed by accurately controlling sputtering such that it has a resulting thickness of 100 Å. When operating the electro-optical device including such MIM elements at a duty ratio of 1/500, the device has somewhat lower contrast compared to the device of FIG. 7, but remains acceptable for practical use.

Specific advantages of the MIM elements appeared in accordance with the invention include simplification of the manufacturing process without deterioration of the quality of the display. This results in an improved rate of production at reduced cost. Significantly, the reliability of the device is improved as the second metal film is in complete contact with the transparent picture cell element. Finally, a liquid crystal device constructed in accordance with the invention is small in size and light in weight.

It will thus be seen that the objects set forth above, among those made apparent from the preceding description, are efficiently attained, and certain changes may be made in the above construction and steps without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A metal-insulator-metal device, formed on a substrate, comprising:
   a first metal film selectively patterned on the substrate;
   an insulating film on said first metal film;
   a transparent second metal film formed on the substrate in the configuration of a display electrode and on the insulating film so that at least a portion of the transparent second metal film is opposed to a portion of the first metal film with the insulating film between, to form a metal-insulator-metal structure; and
   a transparent picture cell electrode formed from a different material than the second metal film on said second metal film in the same configuration and shape as the second metal film to overlap completely the second metal film.

2. The metal-insulator-metal device of claim 1, wherein the second metal film has a thickness less than about 100 Å.

3. The metal-insulator-metal device of claim 1, wherein the second metal film has a thickness less than about 50 Å.

4. The metal-insulator-metal device of claim 1, wherein the substrate is glass.

5. The metal-insulator-metal device of claim 1, wherein the first metal film is tantalum, the insulating film is tantalum oxide, the second metal film is chromium, and the electrode is indium tin oxide.

6. The metal-insulator-metal device of claim 5, wherein the substrate is glass and the second metal film has a thickness less than or equal to 100 Å.

7. The metal-insulator-metal device of claim 5, wherein the first metal film has a thickness of about 3000 Å.

8. The metal-insulator-metal device of claim 1, wherein the second metal film is selected from the group consisting of Cr, NiCr or Ta.

9. The metal-insulator-metal device of claim 1, wherein the first metal film is Ta and the insulator film is $Ta_2O_5$.

10. The metal-insulator-metal device of claim 8, wherein the second metal film is Cr and has a thickness of about 50 Å.

11. The metal-insulator-metal device of claim 8, wherein the second metal film is Ta and has a thickness of about 100 Å.

12. A process for preparing a metal-insulator-metal device on a substrate, comprising:
   providing a transparent substrate;
   forming a first metal film on the substrate in a selective pattern;
   forming an insulating film on the top surface of the first metal film;
   forming a second metal film on the substrate with at least a portion of the second metal film opposed to the first metal film with the insulating film therebetween; and
   forming a transparent picture cell electrode on the second metal film having substantially the same shape and configuration as the second metal film to overlap completely the second metal film, the transparent picture cell electrode formed of a different material than the second metal film.

13. The method of claim 12, wherein the first metal film is tantalum, the insulator film is tantalum oxide, the second metal film is chromium, and the electrode is indium tin oxide.

14. The method of claim 12, wherein the thickness of the second metal film is less than or equal to 100 Å.

15. The method of claim 12, wherein the first metal film is Ta and the insulating film is $TaO_5$.

16. A liquid crystal display device wherein non-linear elements composed of metal-insulator-metal devices are arranged in a matrix corresponding to picture display cells, said metal-insulator-metal device comprising:
   a substrate;
   a first metal film selectively patterned on the substrate;
   an insulating film covering said first metal film;
   a second metal film formed both on the substrate and on the insulating film so that at least a portion of the second metal film is opposed to a portion of the first metal film with the insulating film therebetween; and
   a transparent picture cell electrode formed on said second metal film in the same configuration and shape as the second metal film to overlap completely the second metal film, the picture cell electrode formed of a different material than the second metal film.

17. The liquid crystal display device of claim 16, wherein the second metal film has a thickness less than about 100 Å.

18. A metal-insulator-metal device, comprising:
   a substrate;
   a first metal film selectively patterned on the substrate;
   an insulating film on said first metal film;
   a transparent second metal film formed both on the substrate and on the insulating film in substantially the shape of a picture cell electrode with a thickness less than about 100 Å so that a portion of the second metal film is opposed to a portion of the first metal film with the insulating film therebetween; and
   a transparent picture cell electrode of a metal oxide is formed on said second metal film wherein the transparent picture cell electrode is patterned in substantially the same shape and configuration as the second metal film to cover completely in plan view the second metal film on the first metal film and substrate.

19. The metal-insulator-metal device of claim 18, wherein the second metal film is selected from the group consisting of Cr, NiCr, or Ta.

20. The metal-insulator-metal device of claim 1, wherein the first metal film is tantalum, the insulating film is tantalum oxide, and the second metal film is chromium.

21. A metal-insulator-metal device, comprising:
   a substrate;
   a first metal film of tantalum selectively patterned on the substrate;
   an insulating film of tantalum oxide on said first metal film;
   a second metal film of chromium formed both on the substrate and on the insulating film so that the second metal film overlaps at least a portion of the first metal film in plan view; and a transparent picture cell electrode of indium tin oxide formed on said second metal film to overlap completely the second metal film.

22. The metal-insulator-metal device of claim 20 wherein the substrate is glass and the second metal film has a thickness less than or equal to 100 Å.

23. The metal-insulator-metal device of claim 20 wherein the first metal film has a thickness of about 3000 Å.

24. A process for preparing a metal-insulator-metal device on a substrate, comprising:
providing a transparent substrate;
forming a first metal of tantalum film on the substrate in a selective pattern;
forming an insulating film of tantalum oxide on the top surface of the first metal film;
forming a second metal film of chromium on the substrate and extending it to overlap at least a portion of the first metal film; and
forming a transparent picture cell electrode of indium tin oxide on the second metal film having substantially the same shape as the second metal film.

25. The metal-insulator-metal device of claim 3, wherein the picture cell electrode is ITO.

* * * * *